United States Patent [19]

Seppa

[11] 4,209,846
[45] Jun. 24, 1980

[54] MEMORY ERROR LOGGER WHICH SORTS TRANSIENT ERRORS FROM SOLID ERRORS

[75] Inventor: Dale K. Seppa, New Brighton, Minn.

[73] Assignee: Sperry Corporation, New York, N.Y.

[21] Appl. No.: 856,706

[22] Filed: Dec. 2, 1977

[51] Int. Cl.² ............................................. G06F 11/00
[52] U.S. Cl. ...................................... 364/900; 371/38
[58] Field of Search ........................................ 235/312; 364/200 MS File, 900 MS File; 365/201, 200

[56] References Cited

U.S. PATENT DOCUMENTS

| | | | |
|---|---|---|---|
| 3,704,363 | 11/1972 | Salmassy et al. | 364/200 X |
| 3,999,051 | 12/1976 | Petschauer | 235/312 X |
| 4,045,779 | 8/1977 | Markle | 364/200 |

*Primary Examiner*—Gareth D. Shaw
*Assistant Examiner*—Thomas Heckler
*Attorney, Agent, or Firm*—John L. Rooney; Kenneth T. Grace; Marshall M. Truex

[57] ABSTRACT

A method of and an apparatus for distinguishing between transient and solid errors within a single-error-correcting semiconductor memory storage unit (MSU) comprised of a plurality of large scale integrated (LSI) bit planes and for notifying the associated data processing system of required maintenance action. The method utilizes an error logging store (ELS) that is comprised of a plurality of memory error registers one for each separately associated word group within the MSU. Each memory error register contains storage for: (1) the Error Correction Code (ECC) defined, failing bit position; (2) the single bit error counter; (3) the multiple single bit error tag; and (4) the multiple bit error tag. Upon detection of an error within a word group, the associated memory error register is accessed to determine the history of previously detected errors within that word group. The central processing unit (CPU) is notified by a priority interrupt of the error status of that word group if:

(1) the number of consecutive errors within a word group at the same bit position reaches a set threshold indicating the high probability of a solid single bit error; or (2) the error detected is in a different bit position from that previously identified as a solid single bit error indicating the high probability of a future uncorrectable multiple-bit error.

This method and apparatus notifies the CPU of the likelihood of imminent uncorrectable errors and maintains a history of the error indications that lead to that conclusion.

3 Claims, 8 Drawing Figures

MEMORY ERROR LOGGER WHICH SORTS TRANSIENT ERRORS FROM SOLID ERRORS

BACKGROUND OF THE INVENTION

Semiconductor storage units made by large scale integrated circuit techniques have proven to be cost-effective for certain applications of storing digital information. Most storage units are comprised of a plurality of similar storage devices or bit planes each of which is organized to contain as many storage cells or bits as feasible in order to reduce per bit costs and to also contain addressing and read and write circuits in order to minimize the number of connections to each storage device. In many designs, this has resulted in an optimum storage device or bit plane that is organized as M words of 1 bit each where M is some power of two, typically 256, 1024 or 4096. Certain contemporary technologies produce devices of $2^{14}$ or more bits. Because of the 1 bit organization of the storage device, single bit error correction as described by Hamming in the publication "Error Detecting and Correcting Codes," R. W. Hamming The Bell System Journal, Volume XXIX, April, 1950, No. 2, pp. 147–160, has proven quite effective in correcting the error of a single storage cell or bit in a given word, i.e., a single bit error, the word being of a size equal to the word capacity of the storage unit, without causing loss of data readout from the storage unit. This increases the effective mean-time-between-failure (MTBF) of the storage unit.

These errors may be classified either as short-lived or long-lived and are designated "transient" (intermittent) or "solid" (permanent, hard), respectively. A transient error may, for example, be the result of a sudden fluctuation in the power supply or the result of a momentary presence of electric or magnetic noise in or near the system. A permanent error may, for example, result from the breakdown of a component such as a transistor or diode. A permanent or solid error is normally the symptom of a component failure, whereas a transient error by its nature may be the result of indeterminate and unrepeatable causes. For their purposes, maintenance personnel must respond to a solid failure with corrective action but are likely powerless to act upon transient errors.

Because the storage devices are quite complex, and because many are used in a semiconductor memory storage unit, they usually represent the predominant component failure in a storage unit. Consequently, it is common practice to employ some form of single bit error correction along the lines described in Hamming. While single bit error correction allows for tolerance of storage cell failures, as more of them fail, the statistical chance of finding two of them, i.e., a double bit error, in the same word increases. Since two failing storage cells in the same word cannot be corrected, it would be desirable to replace all defective storage devices before this occurred, such as at a time when the storage unit would not be in use but assigned to routine preventative maintenance.

While it would be possible to replace each defective storage device shortly after it failed, this normally would not be necessary. It would be more economical to defer replacement until several storage devices were defective thereby achieving a better balance between repair costs and the probability of getting a double failure in a given word. One technique for doing this is to use the central processor to which the storage unit is connected to do this as one of its many other tasks under its normal logic and program control. However, this use of processor time effectively slows down the processor for its intended purpose since time must be allocated to log errors from the storage unit. The effect of this can be better understood when it is noted that a complete failure of a storage device in an often-used section of the storage unit may require a single error to be reported every storage cycle. Since the processor may need several storage cycles to log the error, a great loss of performance would result. One method which has been used to alleviate this is to sample only part of the errors, but this causes lack of logging completeness.

The present art uses a technique referred to as "error logging" disclosed by Petschauer in U.S. Pat. No. 3,999,051. The problem with the Petschauer approach is its inability to distinguish between transient and solid errors, thereby notifying operators of and scheduling maintenance periods partially as a function of transient errors which are of little immediate operational concern.

The novel procedure described herein alleviates the above problem by distinguishing between solid and transient errors and further reports only those conditions wherein a solid error (and, therefore, a component failure) are present. This procedure also has the advantage that no modifications need to be made to the logic of the central processor when a storage unit is replaced with one that embodies error correction features. This allows, for example, the inclusion of error correction in a storage unit and connection of it to an existing or in-use processor without any changes to the processor at installation time.

SUMMARY OF THE INVENTION

Figure 4:
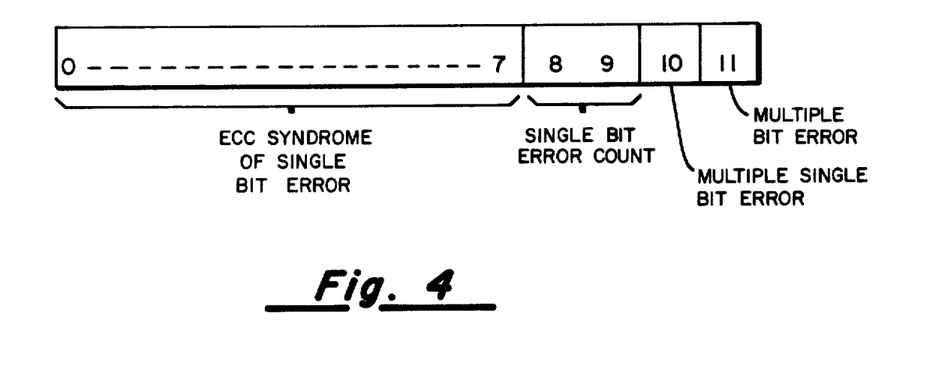
FIG. 4 is an illustration of the format of each memory error register within the ELS.

The present invention utilizes an error logging store (ELS) which is composed of a number of memory error registers each corresponding to a range of addresses of the memory system. The size of the range of addresses is equal to the smallest replaceable part, namely the memory storage element or integrated circuit itself. Thus, a memory storage unit comprised of $2^{14}$-bit storage devices would have an entry reserved in the error logger for each $2^{14}$ words of storage. For an MSU which is structured for the storage of 72-bit words, for example, each error log entry would have 12 bits and would be formatted as shown in FIG. 4. Each of the fields is defined as follows:

ECC Syndrome of Single Bit Error—The 8 bits define the failing bit position of the storage word as defined by its ECC error syndrome (the width of this field corresponds to the width of the data word orientation of the MSU as determined by the number of error correction code bits for Single Error Correction/Double Error Detection).

Single Bit Error Counter—The single bit error counter is incremented by 1 each time the same bit position described by the ECC syndrome (bits $2^0$ through $2^7$) is detected as in error.

Multiple Single Bit Error—When the condition of a single bit failure (Solid error) are met (the single bit error counter is frozen at the solid error threshold), a single bit error at another bit position (i.e., a different bit plane) will cause this bit to be set resulting in notification to the CPU via priority interrupt.

Multiple Bit Error—Whenever a multiple bit error is detected in the storage word, this bit is set.

The CPU is notified of the necessity for maintenance via priority interrupt when:

(1) a single bit solid error is declared (single bit error count is incremented to threshold value); and (2) a single bit solid error has been declared and another bit position is in error within the same word group.

DESCRIPTION OF THE PREFERRED EMBDOIMENT

Figure 1:
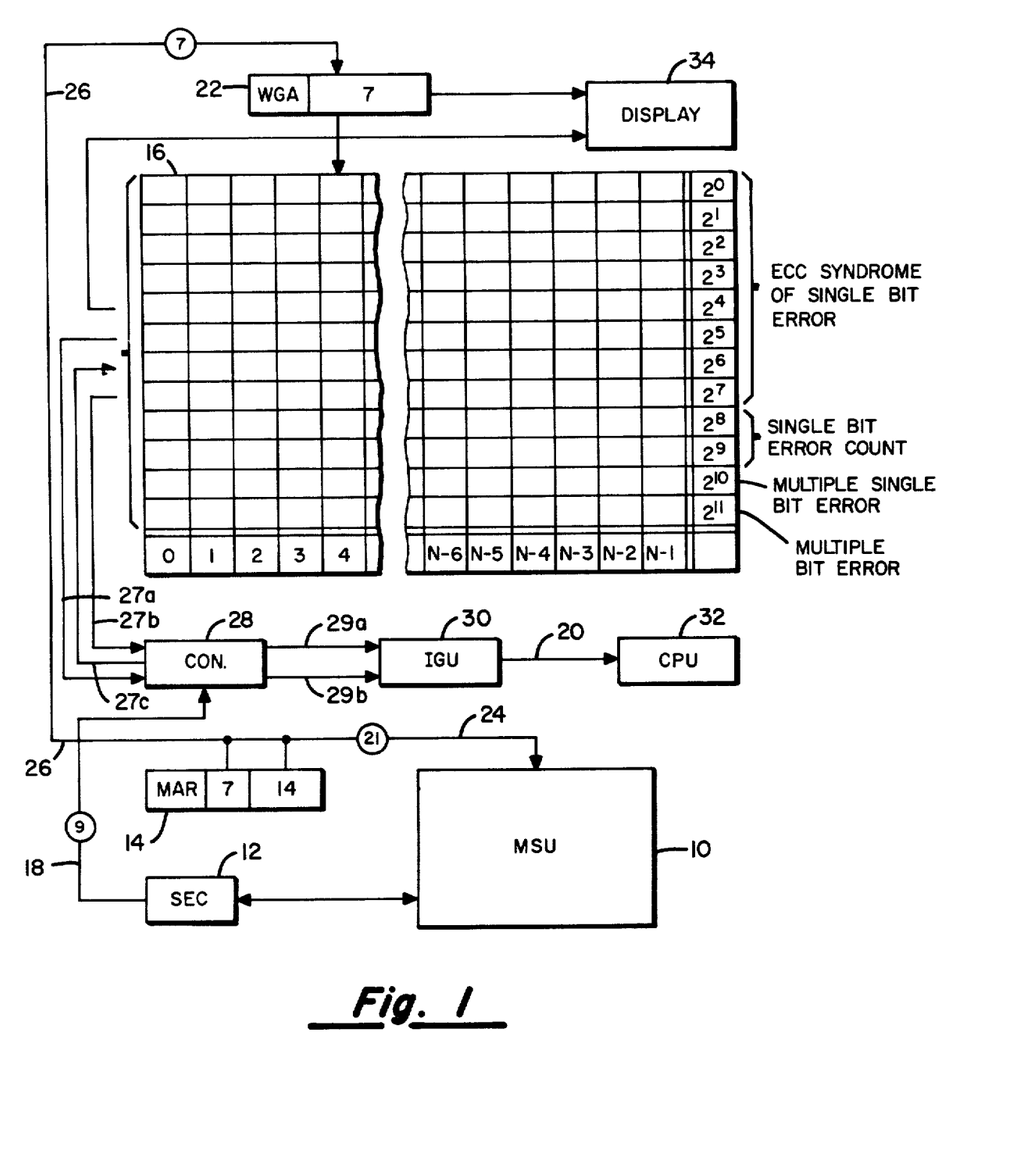
FIG. 1 is an illustration of a memory system incorporating the present invention.

With particular reference to FIG. 1 there is illustrated a memory system incorporating the present invention. The Memory Storage Unit (MSU) 10 is of a well-known design configured according to FIG. 2. MSU 10 is a semiconductor memory having N word groups each having M words of word length W bits. In an embodiment wherein MSU 10 is a portion of the main memory of Central Processing Unit, CPU 32, M will be on the order of $2^{10}$ with present technologies and W will be on the order of 45 bits. The invention is equally applicable, however, wherein MSU 10 is an on-line mass storage subsystem for which M is presently on the order of $2^{14}$ and W is on the order of 72 bits. It is the latter configuration that is further described herein. For that configuration, MSU 10 is organized into N word groups each word group having 72 bit planes, each bit plane being a large scale integrated (LSI) plane of $2^{14}$ bits or memory locations. A semiconductor memory system that would define an exemplary Memory Storage Unit (MSU) would be the Intel Corp. Part No. 2117, the MOSTEK Corp. Part No. 4116, or the Texas Instrument Corp. Part No. 4116. The like-ordered bit planes of each of the N word groups are also configured into 72 bit plane groups and one like-ordered bit out of the $2^{14}$ bits of each of the 72 bit planes in the one selected word group. This causes the simultaneous readout, i.e., in parallel, of the 72 like-ordered bits that constitute the one selected or addressed word.

Figure 3:
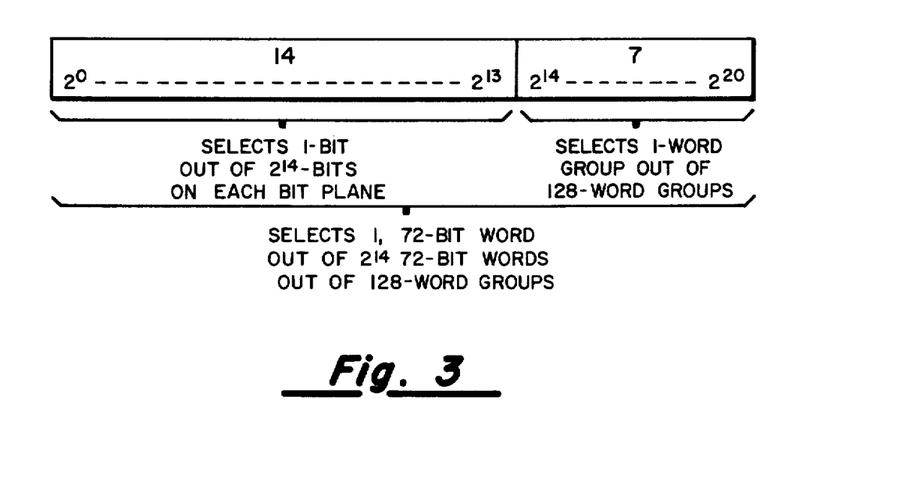
FIG. 3 is an illustration of the format of an address word utilized to address a word in the MSU of FIG. 1 assuming an N of 128 word groups and an M of $2^{14}$ bits on each bit plane.

With particular reference to FIG. 3 there is illustrated the format of an address word utilized to select or address one word out of the $2^{21}$ words stored in MSU 10 (N was chosen as 128 for this embodiment). In this configuration of the address word, the higher-ordered 7 bits, $2^{14}$-$2^{20}$, according to the 1's or 0's in the respective bit locations $2^{14}$-$2^{20}$, select one word group out of the 128 word groups while the lower-ordered 14 bits, $2^0$-$2^{13}$ select or address one bit of the $2^{14}$ bits on each of the 72 bit planes in the word group selected by the higher-ordered bits $2^{14}$-$2^{20}$. MSU 10 utilizes a single error correction circuit (SEC) 12—see the hereinabove cited publication of Hamming—for the determination and correction of single bit errors in each of the 72 bit words stored therein. Also illustrated in FIG. 1 is a memory address register (MAR 14), such as that discussed above with particular reference to FIG. 3, for addressing or selecting one out of the $2^{21}$ 72-bit words stored in MSU 10.

Figure 2:
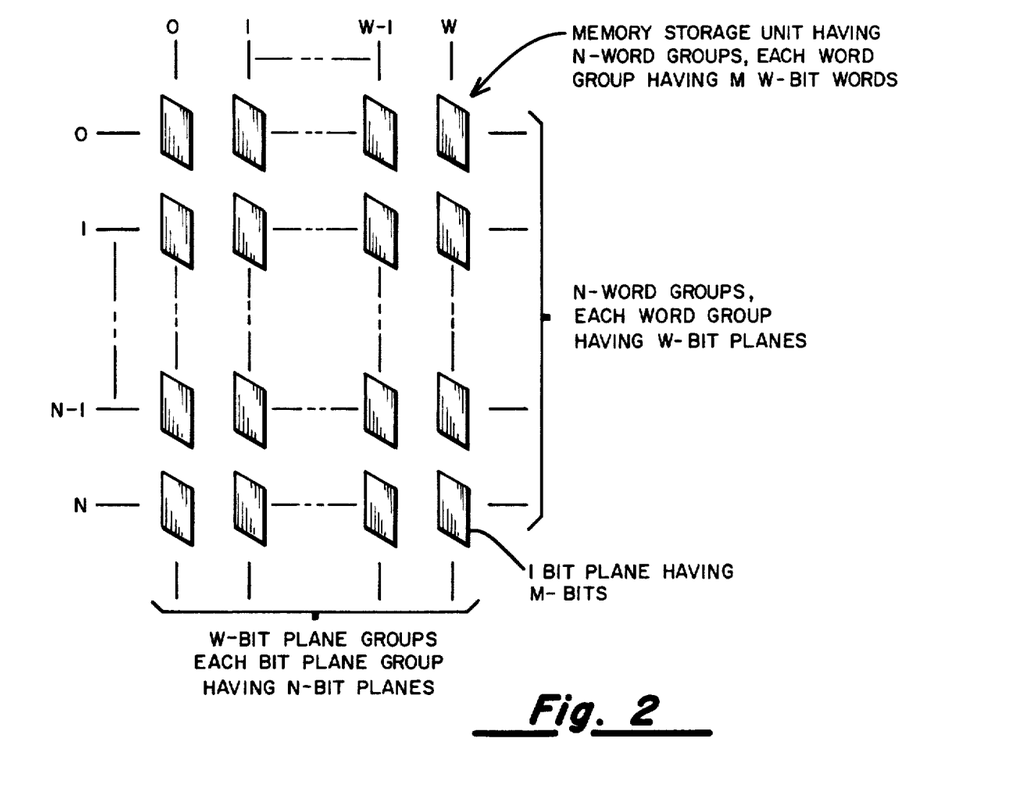
FIG. 2 is an illustration of how the replaceable bit planes are configured in the MSU of FIG. 1.

SEC 12, while correcting any single error in the word addressed in MSU 10, also generates an error word comprising two other signals: an error signal, a 1 bit denoting an error condition or a 0 bit denoting no error condition; and 8 syndrome bits that identify the 1 bit plane group that contains the defective bit out of the 72 bit plane groups in which MSU 10 is configured as previously discussed with particular reference to FIG. 2.

In accordance with the present invention, there is provided an error logging store (ELS 16) which is comprised of the memory error register that is associated with each word group within MSU 10. In the instant embodiment, MSU 10 contains 128 word groups such that N is equal to 128 and ELS 16 contains 128 memory error registers. A semiconductor memory system that would define an exemplary Error Logging Store (ELS) 16 would be the Fairchild Corp. Part No. 93421 or the AMD Corp. Part No. 276500. ELS 16 is preferably an LSI semiconductor memory array comprising 128 12-bit memory error registers each memory error register having a format as illustrated by FIG. 4. MSU 10, SEC 12, and MAR 14 operate to form a memory system that employs single error correction, i.e., any one bit in any one of the $2^{21}$ 72-bit words if defective is correctable by SEC 12 permitting the associated data processing system to function as if no error had been detected; however, two or more errors, i.e., two or more bits in any one word being defective, are noncorrectable by SEC 12 requiring the associated data processing system to institute other error correcting procedures, e.g., to reload the erroneous data word back into MSU 10 from another source.

The errors detected by SEC 12 may be classified as either transient or solid. The latter requires remedial maintenance activity, whereas the former will not likely be observed again with the same error symptoms. Therefore, it becomes important to distinguish between these two categories of error when determining the schedule for and the nature of corrective maintenance activity.

Figure 5:
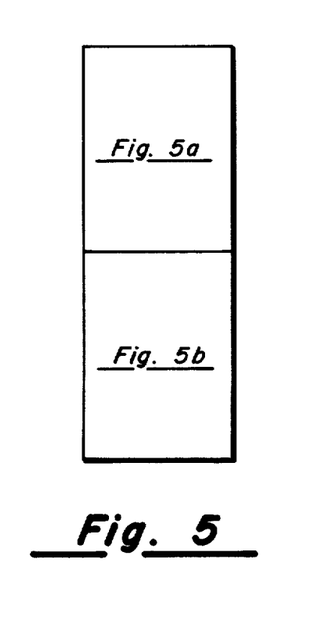
FIGS. 5a and 5b, arranged as shown in FIG. 5, are a functional flow diagram which illustrates the activity taken as a result of each error condition.
Figure 5A:
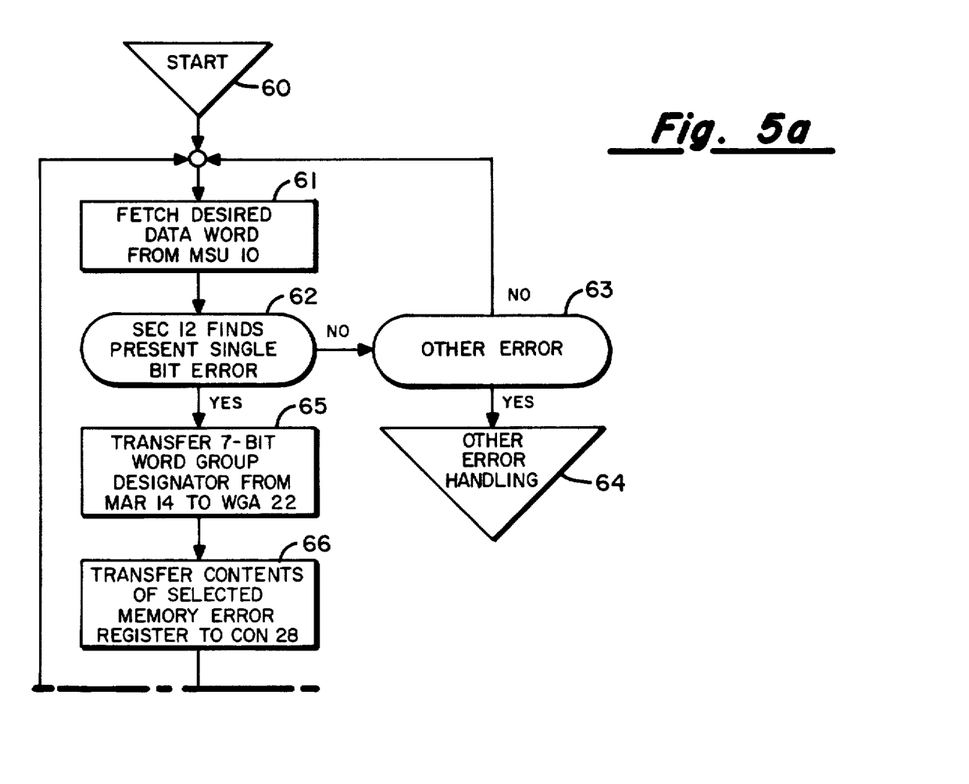
Figure 5B:
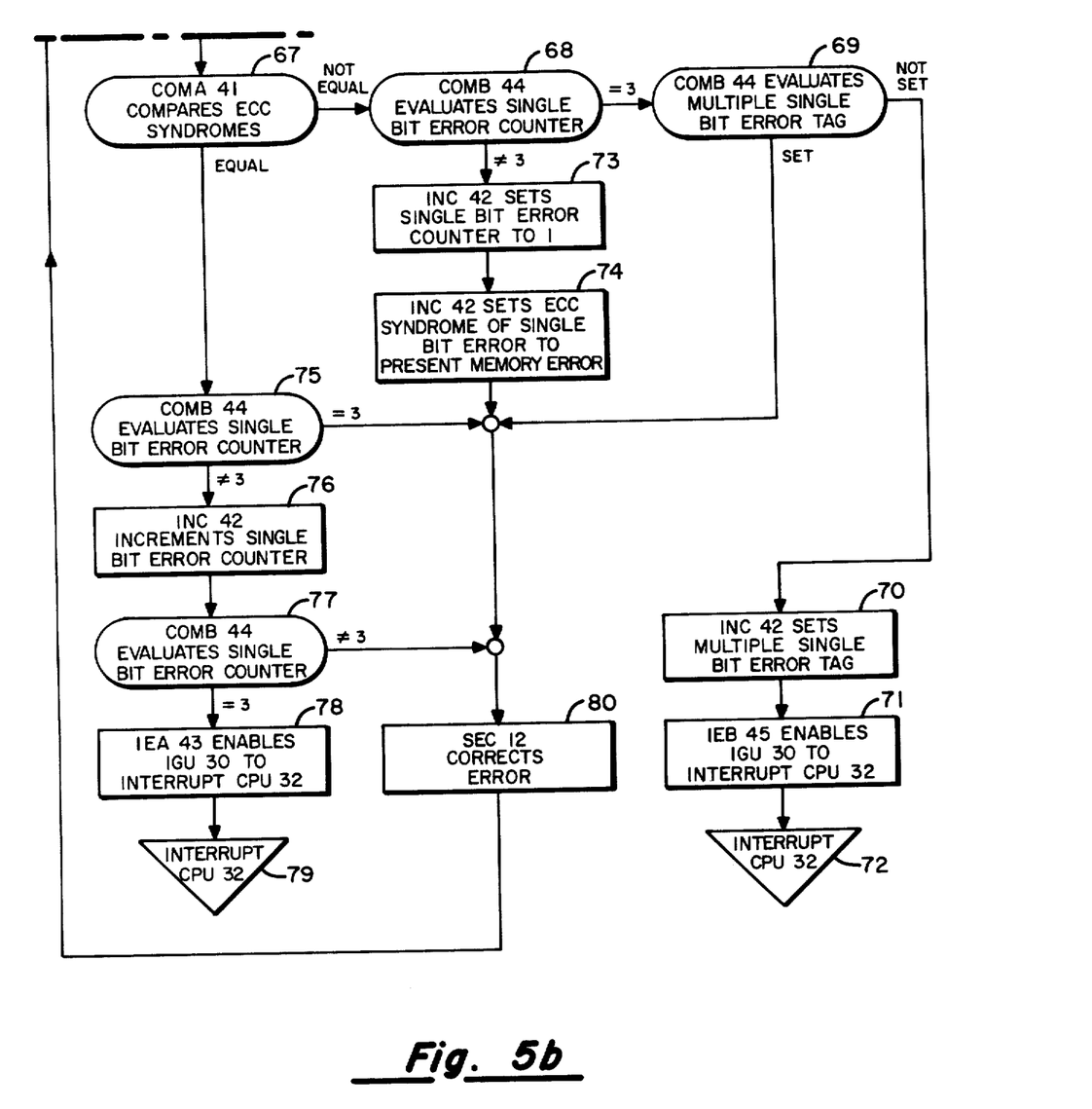

To effect the desired distinction, an error logging store control means (CON 28) is employed for evaluating each present memory error sensed by SEC 12. CON 28 accomplishes this evaluation by comparing each present memory error with the contents of that memory error register within ELS 16 associated with the word group within MSU 10 that generated the present memory error. It is on the basis of this comparison that CON 28 decides what action to take (i.e., modification of the contents of ELS 16 or generation of an interrupt to CPU 32 or both or no action). FIG. 5 provides a functional flow diagram of the steps performed by CON 28 and the other system elements involved in this process; the constituent parts of CON 28 are shown in FIG. 6.

As can be seen in FIG. 5, after the data processing system has been started at element 60, data words are continuously fetched from MSU 10, and each is evaluated for a present single bit error by SEC 12. It is assumed that all memory error registers of ELS 16 are clear (i.e., contain all 0's) after the process has started but before the first memory error is sensed. Assuming no errors are found, the fetch operation, element 61, and the SEC 12 error check, element 62, are continuously performed. The other error check, element 63, corresponds to other checks that may be made within the data processing system. This process will continue, as long as the data processing system is running until such time as SEC 12 detects a present memory error in a reference to MSU 10. As previously mentioned, each reference to MSU 10 is addressed by the contents of MAR 14. As indicated in FIG. 5, element 65, the most significant 7 bits (i.e., $2^{14}$-$2^{20}$) of that address are transferred to Word Group Address Register, WGA 22, via line 26 as shown in FIG. 1. Those 7 bits actually select 1 word group out of 128 word groups as illustrated by FIG. 3. These 7 bits permit WGA 22 to select from ELS 16, the memory error register associated with the word group of MSU 10 being addressed by MAR 14. As an example, if MAR 14 contains the multi-bit address word 42 via line 51a and first priority interrupt enable gate, IEA 43, via line 51b. In this case, however, because there were not previous errors since system start-up, memory error register 2 contains all 0's, and the comparison yields inequality setting line 52 to second priority interrupt enable gate, IEB 45. This will not cause the generation of a priority interrupt, however, as explained below. FIG. 5, element 67, illustrates this comparison functionally.

Figure 6:
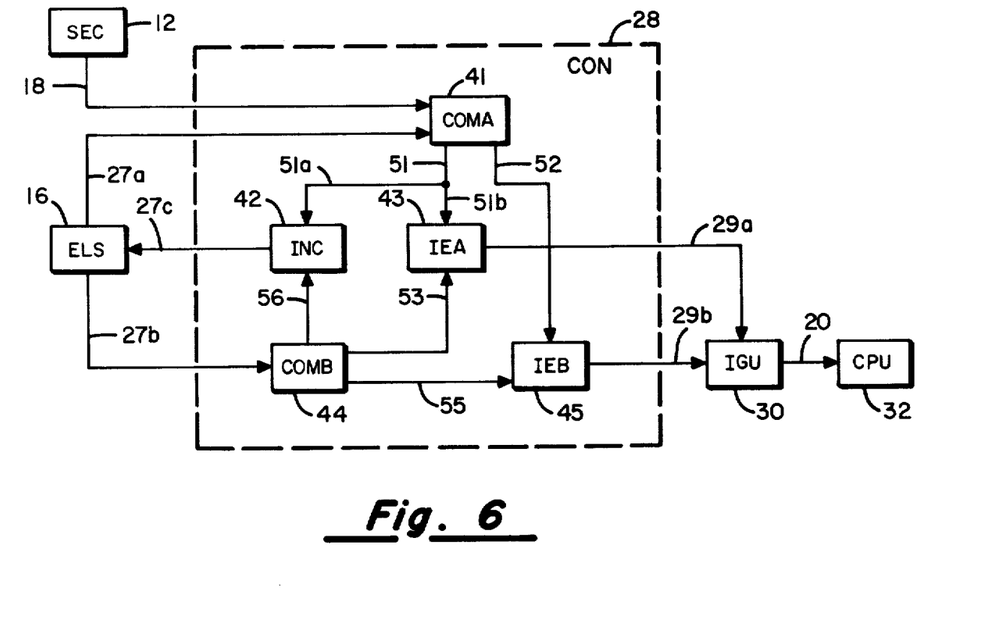
FIG. 6 is a detailed illustration of the error logging store control.

As previously mentioned, COMB 44 receives the 4 higher order (most significant) bits (i.e., $2^8$-$2^{11}$) from ELS 16 (memory error register 2) via line 27b as shown in FIG. 6. COMB 44 evaluates the single bit error count which is found at bit positions $2^8$ and $2^9$ as illustrated in FIG. 4. This evaluation is shown functionally in FIG. 5 as either element 68 or 75. Because the comparison of COMA 41 yielded inequality in this case, element 68 represents this evaluation. Because memory error register 2 contains all 0's, bits $2^8$ and $2^9$ are 0's and the evalua-

```
       2⁰  2¹  2²  2³  2⁴  2⁵  2⁶  2⁷  2⁸  2⁹  2¹⁰ 2¹¹ 2¹² 2¹³
LSB  [  0   1   0   0   0   0   0   0   0   0   0   0   0   ]
                                               2¹⁴ 2¹⁵ 2¹⁶ 2¹⁷ 2¹⁸ 2¹⁹ 2²⁰
                                              [  0   1   0   0   0   0   0  ]  MSB
``` the higher-ordered 7 bits, $2^{14}$-$2^{20}$, are transferred to word-group address register (WGA 22) via line 26 selecting ELS 16 memory error register 2 as illustrated in FIG. 1. The contents of memory error register 2 are then transferred to CON 28 as shown in FIG. 5, element 66. FIG. 6 illustrates that the transfer actually occurs over both line 27a to eight bit comparator, COMA 41, and line 27b to four bit comparator, COMB 44. Referring to FIG. 4 wherein the format of the memory error register is presented, it can be seen that the contents can be divided into two constituent parts. The 8 lower order (least significant) bits (i.e., bits $2^0$-$2^7$) contain the ECC syndrome of single bit error. This quantity describes the bit position observed to be in error (all 0's before first error is processed). These 8 bits are transferred to COMA 41 via line 27a. The 4 higher order (most significant) bits (i.e., bits $2^8$-$2^{11}$) contain the error history data. These 4 bits are transferred to COMB 44 via line 27b (also all 0's before first error is processed). See FIG. 6.

As has been previously stated, SEC 12, upon the detection of an error, transfers to CON 28 the 8-bit ECC syndrome of the present memory error describing the failing bit position and an error signal indicating that a single bit error has been detected at the bit position identified by that 8-bit ECC syndrome. Upon sensing this tag bit, COMA 41 compares the 8-bit ECC syndrome received from SEC 12 with the 8-bit ECC syndrome received from ELS 16 (memory error register 2 in this example) as illustrated in FIG. 6. Should the comparison indicate equality, line 51 is set true signifying this equality to two bit incrementing counter, INC tion yields a $\neq 3$ result ($2^8=0$, $2^9=0\rightarrow 0$; $2^8=1$, $2^9=0\rightarrow 1$; $2^8=0$, $2^9=1\rightarrow 2$; $2^8=1$, $2^9=1\rightarrow 3$). INC 42 is notified via line 56 that the evaluation has yielded a $\rightarrow$ result as shown in FIG. 6. INC 42 increments the single bit error counter as illustrated in FIG. 5 elements 73 and 76 (element 73 in this example). Incrementation is increasing the count within the single bit error counter by 1 ($2^8=1$, $2^9=0\rightarrow 1$ in this example). Furthermore, INC 42 transfers the ECC syndrome of present single bit error to ELS 16 (memory error register 2) via line 27c as illustrated in FIG. 6. FIG. 5, element 74, shows this function. In the present example, SEC 12 then merely corrects the error at element 80, and the system proceeds by fetching the next desired word from MSU 10 as shown in element 61. This error logging process continues each time SEC 12 notifies CON 28 that it has detected an error in a reference to MSU 10.

The two types of priority interrupts that may be generated are:

(1) a single bit solid failure is declared (single bit error count is incremented to threshold value of 3); or
(2) a single bit solid failure has previously been declared and another bit position is in error within the same word group.

Both priority interrupts to CPU 32 are generated by priority interrupt generation unit, IGU 30, via line 20 as illustrated in FIG. 6. The first is enabled by IEA 43 via line 29a, and the second is enabled by IEB 45 via line 29b. Table A, below, describes the conditions under which each priority interrupt is generated.

| MULTIPLE SINGLE BIT ERROR | DOES SINGLE BIT ADDRESS COMPARE | SINGLE BIT COUNT BEFORE ERROR | COUNTER ACTION | SINGLE BIT COUNT AFTER ERROR | LOGGING ACTION | INTERRUPT ACTION |
|---|---|---|---|---|---|---|
| Not Set | No | $\leq 2$ | Set to 1 | 1 | Log new first single bit address | No Interrupt |
| Not Set | Yes | <2 | Increment | <3 | Don't care | No Interrupt |
| Not Set | Yes | 2 | Increment | 3 | Don't care | Interrupt |
| Not Set | Yes | 3 | Inhibit Count | 3 | Don't care | Suppress Interrupt |
| Not Set | No | 3 | Inhibit | 3 | Set Multiple | Interrupt |

-continued

| MULTIPLE SINGLE BIT ERROR | DOES SINGLE BIT ADDRESS COMPARE | SINGLE BIT COUNT BEFORE ERROR | COUNTER ACTION | SINGLE BIT COUNT AFTER ERROR | LOGGING ACTION | INTERRUPT ACTION |
|---|---|---|---|---|---|---|
|  |  |  | Count |  | single bit error; do not change single bit address |  |
| Set | No | 3 | Inhibit Count | 3 | None | No Interrupt |

The logic which causes IEA 43 to enable a priority interrupt signifying the declaration of a single bit solid failure is illustrated in FIG. 5. Upon detection of a memory error by SEC 12, COMA 41 compares at element 67, the ECC syndrome of the present memory error as transferred from SEC 12 with the ECC syndrome of single bit error register as transferred to CON 28 at element 66. If the comparison yields equality, COMB 44 evaluates the single bit error counter at element 75. If the single bit error counter evaluation yields ≠3, INC 42 increments the single bit error counter at element 76 (evaluated at element 68 and incremented at element 73 in the previous example). Should COMB 44 determine at element 77 that such incrementation will produce a single bit error counter value ≠3, SEC 12 will correct the error at element 80, and the system will resume at element 61 as above. Should COMB 44 determine at element 77 that such incrementation will produce a single bit error counter value =3, however, IEA 43 enables a priority interrupt as shown at element 78. FIG. 6 illustrates this result. COMA 41 has set line 51, and hence 51b, true to indicate that comparison of the ECC syndrome has yielded equality. Furthermore COMB 44 notifies IEA 43 via line 53 that incrementation of the single bit error counter has yielded =3. Therefore, IEA 43 via line 29a enables IGU 30 to interrupt CPU 32 via line 20.

The logic which causes IEA 45 to enable a priority interrupt to CPU 32 indicating that a single bit solid failure has previously been declared and another bit position is in error within the same word group is also illustrated in FIG. 5. In this example COMA 41 finds the ECC syndromes from SEC 12 representing the present memory error and from the referenced memory error register representing previous memory errors to be not equal at element 67. COMB 44 evaluates the single bit error counter at element 68. If that evaluation yields →3, the process proceeds as in the initial example. If the evaluation yields =3, the evaluation by COMB 44 of the multiple single bit error tag at element 69 becomes determinative. FIG. 4 shows that this tag is represented within the memory error register as bit position $2^{10}$. As with the other bit positions of each memory error register, bit $2^{10}$ is initially clear (=0). Should COMB 44 find it clear, INC 42 sets the multiple single bit error tag at element 70, and IEB 45 enables IGU 30 to interrupt CPU 32 at element 71. FIG. 6 illustrates this process. When COMA 41 compares the ECC syndromes from the present memory error transferred from SEC 12 via line 18 and previous memory errors transferred from ELS 16 (referenced memory error register) via line 27a, it finds them not equal and, therefore, sets line 52 to IEB 45 to signify the not equal condition. Furthermore, COMB 44 has evaluated the single bit error counter yielding =3 and the multiple single bit error not set as transferred from ELS 16 (referenced memory error register) via line 27b. The coincidence of these two evaluation results causes COMB 44 to set line 55 to notify IEB 45. The coincidence at IEB 45 of line 52 being set representing not equal ECC syndromes and line 55 being set representing a single bit error count =3 and a multiple single bit error tag not set causes IEB 45 to enable via line 29b IGU 30 to generate a priority interrupt to CPU 32 via line 20.

Display 34 as illustrated in FIG. 1 is available for observation by the maintenance operator of the contents of ELS 16. It is of conventional design and its nature and use are disclosed by Petschauer in U.S. Pat. No. 3,906,200.

It is in this manner that the disclosed invention notifies CPU 32 of the likelihood of imminent uncorrectable errors by distinguishing between transient and solid errors and maintains a history of the error indications that lead to the conclusion.

What is claimed is:

1. In a data processing system having a memory system which is configured into N word groups of W bit planes per word group and M bits per bit plane which has a single bit error correction means wherein said single bit error correction means provides a bit encoded error word describing the bit position generating a present single bit memory error and having an error logging store containing a plurality of memory error registers for maintaining a history of memory errors within said error logging store, a method of determining whether said present single bit memory error requires maintenance action comprising:

accessing said error logging store upon notification by said single bit error correction means of a present single bit memory error;

comparing said bit encoded error word describing the bit position generating said present single bit memory error, to the bit encoded error word describing the bit position generating a previous single bit memory error within said memory error register corresponding to the word group containing said present single bit memory error;

incrementing a one of a plurality of single bit error counters corresponding to the bit position generating said present single bit memory error within said memory error register within said error logging store if said comparison indicates that said present single bit memory error and said previous single bit memory error occurred at the same bit position;

interrupting said data processing system when said incrementation causes said single bit error counter to reach a predetermined threshold quantity which signifies the declaration of a solid error; and interrupting said data processing system after said declaration of a solid error and said comparison indicates that the bit position of said present single bit memory error does not equal the bit position of said previous single bit memory error.

2. In a data processing system that includes a central processing unit (CPU), a memory system that is configured into N word groups of W bit planes per word group and M bits per bit plane containing a memory address register used to address a single word in said memory system by specifying which of N word groups and W bit planes it will access and single error correction circuitry coupled to said memory system for generating, upon the detection of each correctable error in said memory system a generated error word that is associated with the one of N word groups in which the correctable error is detected, said generated error word specifying the one bit plane which is in error within said word group, and an error logging store containing N memory error registers, each memory error register dedicated to represent only an associated different one of said N word groups with a word group address register responsively connected to said error logging store and said memory address register for accessing said memory error register corresponding to the word group addressed by said memory address register, the improvement comprising:

interrupt generation means responsively coupled to said central processing unit for generating a priority interrupt signal;

first comparison means responsively coupled to said single error correction circuitry and said memory error register for determining whether said generated error word specifies an error in the same bit plane as previously recorded in said memory error register;

incrementing means responsively coupled to said first comparison means and said memory error register for incrementing a single bit error count contained in said memory error register within said error logging store when said first comparison means determines that said generated error word specifies an error in the same bit plane as previously recorded in said memory error register;

second comparison means responsively coupled to said memory error register for determining when said single bit error count reaches a predetermined error threshold indicating a solid error;

first interrupt enabling means responsively coupled to said second comparison means and said interrupt generation means for enabling said interrupt generation means to generate a priority interrupt to said CPU to notify it that said predetermined error threshold has been reached indicating a solid failure; and     second interrupt enabling means responsively coupled to said first comparison means, said second comparison means, and said interrupt generation means for enabling said interrupt generation means to generate a priority interrupt to said CPU to notify it that said first comparison means has determined that said generated error word does not specify an error in the same bit plane as previously recorded in said memory error register, and that said second comparison means has determined that said predetermined error threshold has previously been reached.

3. In a data processing system containing a memory system which has a single bit error correction means which generates a code representing the bit position of an error logging store comprised of a plurality of memory error registers for maintaining a history of memory errors within said error logging store, the improved error monitoring, and notification method comprising:

accessing said error logging store upon notification by said single bit error correction means of a present single bit memory error;

comparing the contents of said error logging store with said code representing the bit position of said present single bit memory error;

incrementing a one of a plurality of single bit error counters corresponding to the bit position generating said present single bit memory error within said memory error register within said error logging store if said comparing indicates that said present single bit memory error and a previous single bit memory error occurred at the same bit position; and     interrupting said data processing system when said incrementation causes said single bit error counter to reach a predetermined threshold quantity which signifies the declaration of a solid error.

* * * * *